(12) United States Patent
Fukazaki et al.

(10) Patent No.: US 6,334,973 B1
(45) Date of Patent: Jan. 1, 2002

(54) METHOD OF PRODUCING MOLDED ARTICLE

(75) Inventors: Reikou Fukazaki; Teruo Yamashita, both of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/671,615

(22) Filed: Sep. 28, 2000

(30) Foreign Application Priority Data

Oct. 1, 1999 (JP) .................................................. 11-281252
Sep. 19, 2000 (JP) .................................................. 12-283713

(51) Int. Cl.⁷ ............................. C03B 21/00; B29C 51/00
(52) U.S. Cl. ............................. 264/320; 264/322; 65/102
(58) Field of Search ...................................... 264/320, 322

(56) References Cited

U.S. PATENT DOCUMENTS

| | | | |
|---|---|---|---|
| 4,304,751 A | * 12/1981 | Li et al. | ............ 264/322 |
| 4,390,487 A | * 6/1983 | O'Mara | ............ 264/107 |
| 4,595,551 A | * 6/1986 | Maurer | ............ 264/321 |
| 4,944,668 A | * 7/1990 | Asano et al. | ............ 425/397 |
| 5,160,361 A | 11/1992 | Murata et al. | ............ 65/102 |

FOREIGN PATENT DOCUMENTS

| | | |
|---|---|---|
| EP | 0 899 242 | 3/1999 |
| JP | 4-46023 | 2/1992 |
| JP | 4-108620 | 4/1992 |
| JP | 5-124824 | 5/1993 |
| JP | 5-40692 | 6/1993 |
| JP | 5-40694 | 6/1993 |
| JP | 5-163026 | 6/1993 |
| JP | 5-301723 | 11/1993 |
| JP | 7-23226 | 3/1995 |
| JP | 10-245236 | 9/1998 |
| JP | 11-129270 | 5/1999 |
| JP | 11-133257 | 5/1999 |

* cited by examiner

Primary Examiner—Christopher A. Fiorilla
(74) Attorney, Agent, or Firm—Nixon & Vanderhye P.C.

(57) ABSTRACT

A molded article having a highly accurate outer form accuracy, including various optical products, is produced from a preform having a simple form by a press-molding, in which a fine pattern can be highly accurately transferred and no burr is formed. A first mold member having a concave portion with an inner surface made of a molding surface and a second mold member which is to be opposed to the first mold member and has a molding surface are used to press-mold the preform. The preform is shaped in a polyhedral form to permit fitting of the preform in the concave portion of the first mold member.

10 Claims, 9 Drawing Sheets

(a)

(b)

(a)

(b)

(a)

(b)

(a)

(b)

(c)

METHOD OF PRODUCING MOLDED ARTICLE

TECHNICAL FIELD

The present invention relates to a method of producing a molded article. More specifically, it relates to a method of producing a highly accurate molded article such as an optical fiber fixing member, a waveguide, a lens, a microlens array, a prism or a disk substrate from a preform by a molding method.

PRIOR ART

For producing various optical devices such as a lens, a glass molding method attracts attention as a highly efficient less expensive mass-production method and comes to be used. The advantages of this molding method are highly accurate reproducibility, productivity at a high rate and easiness in operation. For producing the above molded article for optical use, it is general practice to employ a method in which a preform made of a material for optical use is pressed and molded in a mold while it is under heat. In this case, it is very important whether the preform and the mold well match each other, since the molded article as an end product is particularly required to have quality stability.

For this reason, for example, JP-A-5-40694 discloses a method of producing a glass lens, in which a preform is processed into a conical form and the processed preform is set in the central portion of a mold with a positioning tool and press-molded. JP-A-4-108620 discloses a method of producing an optical device, in which a molding material having the form of a column and having at least one edge portion chamfered or spherically processed is press-molded. Further, JP-A-5-301732 discloses a method of producing an optical device, in which a preform having a chamfered portion on a circumferential surface is provided and the preform is press-molded in a state where a clearance between the preform and a mold is as small as possible.

When a thin optical substrate having a fine pattern on its surface, for example, an optical fiber guide block which is used for optically connecting a plurality of optical fibers to a plurality of optical fibers or connecting a plurality of optical fibers to an optical part and which has a V groove pattern for fixing fiber cores on an upper surface and a setting portion for fixing a cladding portion on the setting surface at a level lower than the upper surface is produced by a molding method, it is required to deform a molding material (preform) to a greater extent if the above fine pattern and a step are to be formed at the same time. Further, for forming the V groove pattern, for example, at an accumulated pitch accuracy of within ±0.5 µm, it is desirable to use a preform having the form similar to the form of an end product.

The present inventors therefore proposed a method of molding a preform which is provided with a step and which has the form similar to the form of an end product, for securing the transfer accuracy of a fine pattern (JP-A-11-129270 and JP-A-11-133257). When mold members have a gap between them, a molding material is liable to flow through the gap to form burrs, and as a result, the burrs may break away when a molded article is taken out of a mold, to form contaminants or soil the mold and its concave portion. Further, the molded article may be caused to have defects such as cracking and chipping. For preventing the occurrence of burrs, therefore, it was found effective to use a preform which has chamfered portions partly on the front and reverse surfaces thereof and has a step on the front surface side.

When such a preform is prepared by a hot shaping method such as a casting method or a press molding method, the preform imposes almost no problem. However, when it is prepared by a machining method such as a cutting method or a grinding method, procedures according to such a method are complicated and require many processing steps, which causes a problem that a large cost is inevitably required. It has been therefore desired to develop a method of efficiently producing a molded article for optical use from a preform having a simple form with high accuracy and with preventing the occurrence of burrs.

SUMMARY OF THE INVENTION

Under the circumstances, it is therefore an object of the present invention to provide a method of producing a molded article such as various products for optical use by press-molding a preform having a simple form, in which the molded article has high accuracy of an outer form, a fine pattern can be transferred with high accuracy and the occurrence of burrs is prevented.

The present inventors have made diligent studies for achieving the above object, and as a result, it has been found that the above object can be achieved by providing a mold comprising a combination of a first mold member having a concave portion having an inner surface formed of a molding surface and a second mold member opposed to the first mold member, and press-molding a preform having a specific form made of a polyhedron that permits fitting of the preform into the concave portion of said first mold member under heat in said mold. On the basis of the above finding, the present invention has been completed.

That is, according to the present invention, there is provided a method of producing a molded article by providing a mold comprising a combination of a first mold member having a concave portion having an inner surface made of a molding surface and a second mold member which is to be opposed to the first mold member and has a molding surface and press-molding a preform under heat in the mold, the method comprising providing, as said preform, a preform (1) which has a polyhedral form that permits fitting thereof into the concave portion of the first mold member and (2) which has opposed first and second surfaces having different sizes (provided that the second surface is positioned in a region of the first surface when viewed as a plan view), a side surface communicating with a circumferential edge portion of said first surface and a circumferential portion surrounded by an edge portion of the side surface and a circumferential edge portion of said second surface, setting the preform in the mold such that the second surface faces said second mold member, and press-molding the preform such that the distance between the molding surface of the first mold member and the molding surface of the second mold member which are opposed to each other can decrease with following a deformation of the preform while the preform is in state where the preform has a temperature equivalent to, or higher than, a temperature at which the preform is moldable.

BEST MODES OF THE INVENTION

Figure 1:
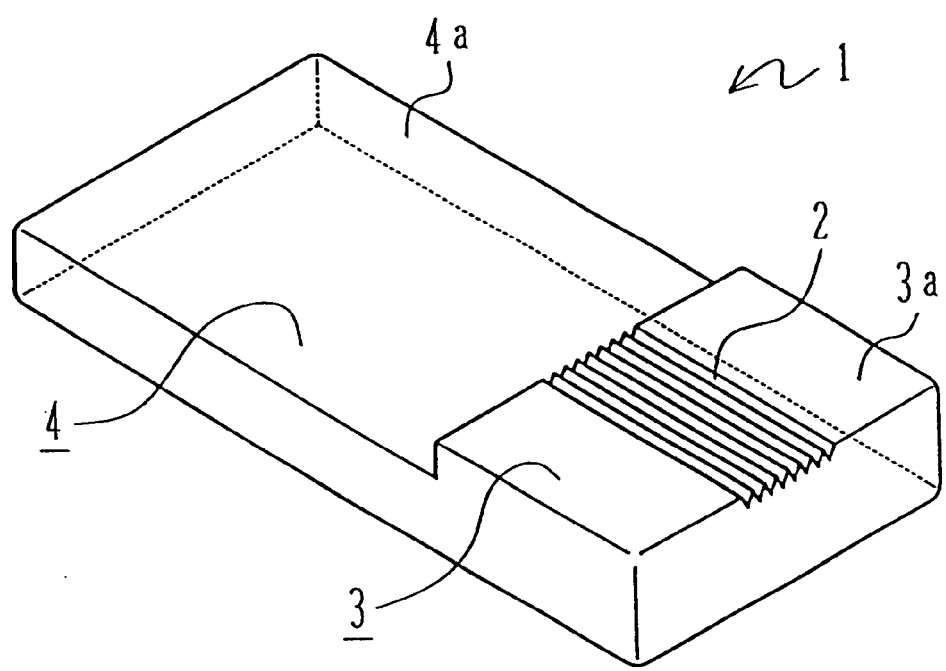
FIG. 1 is a schematic perspective view of an optical fiber guide block produced in the method of the present invention.

The method of producing a molded article, provided by the present invention, is a method in which there is provided a mold comprising a combination of a first mold member having a concave portion having an inner surface made of a molding surface and a second mold member which is to be opposed to the first mold member, and a preform is press-molded in a state where the preform is heated to have a temperature equivalent to, or higher than, a temperature at which the preform is deformable.

The mold for use in the present invention comprises a combination of the first mold member and the second mold member which is to be opposed thereto as described above. Each mold member may be formed of a single member or a plurality of members. Generally, the mold has two mold members (upper and lower mold members) or three mold members (upper and lower mold members and a sleeve) to form a cavity.

In the mold which forms the cavity with two mold members, the first mold member constitutes the lower or upper mold member, and the second mold member which is opposed thereto constitutes the upper or lower mold member. In the present invention, preferably, the first mold member is the lower mold member, and the second mold member is the upper mold member. Generally, one of the upper and lower mold members works as a movable mold member which is movable in predetermined directions.

In the mold which forms the cavity with three mold members, generally, a sleeve is incorporated into the upper or lower mold member and integrated into the upper or lower mold members by closely fixing the sleeve so as not to form any clearance which no preform portion enters during the molding of the preform. In the present invention, preferably, the sleeve is incorporated and integrated into the first mold member to constitute the lower mold member, and the second mold member is used as the upper mold member. One of the upper and lower mold members generally works as a movable mold member which is movable in predetermined directions as described above. In the present invention, the first mold member into which the sleeve is incorporated is used as a movable mold member, and the second mold member is fixed as the upper mold member.

In the method of the present invention, preferably, the molding surface of the above second mold member and a surface surrounding the molding surface constitute a flat one plane. The mold may have a constitution in which the molding surface of the first mold member, the molding surface of the second mold member or both are provided with pattern transfer portion(s). Preferably, the molding surface of the first mold member is provided with a pattern transfer portion. The mold may have step(s) formed in the molding surface of the first mold member, the molding surface of the second mold member or both, and such a mold having the above step(s) and a pattern transfer portion in the molding surface on a lower level may be used. In this case, it is preferred to form the step in the first mold member.

Figure 2:
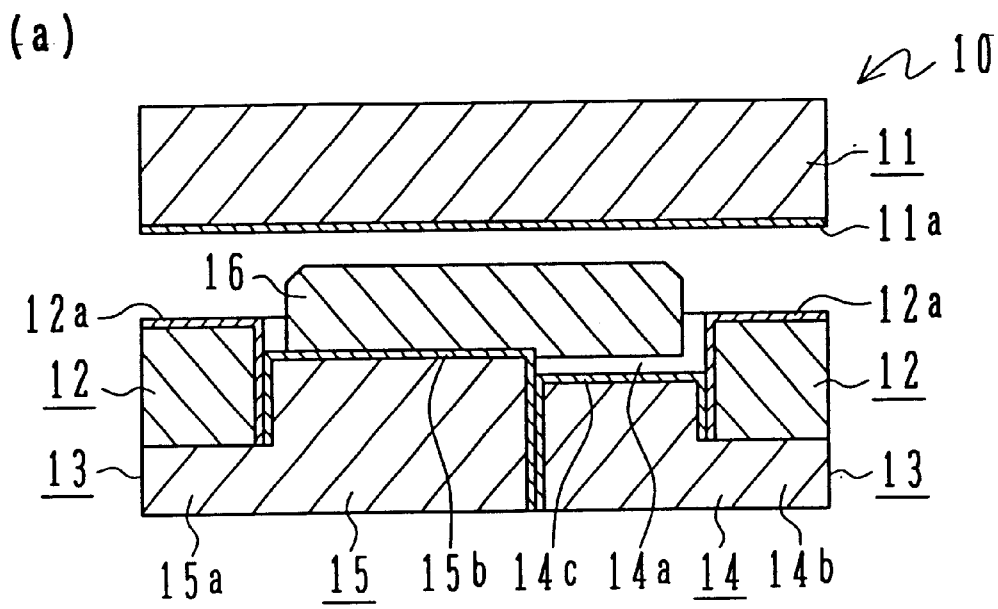
FIGS. 2(a) and 2(b) are schematic cross-sectional views, viewed from a side, of one example of the mold used in the method of the present invention.
Figure 2:
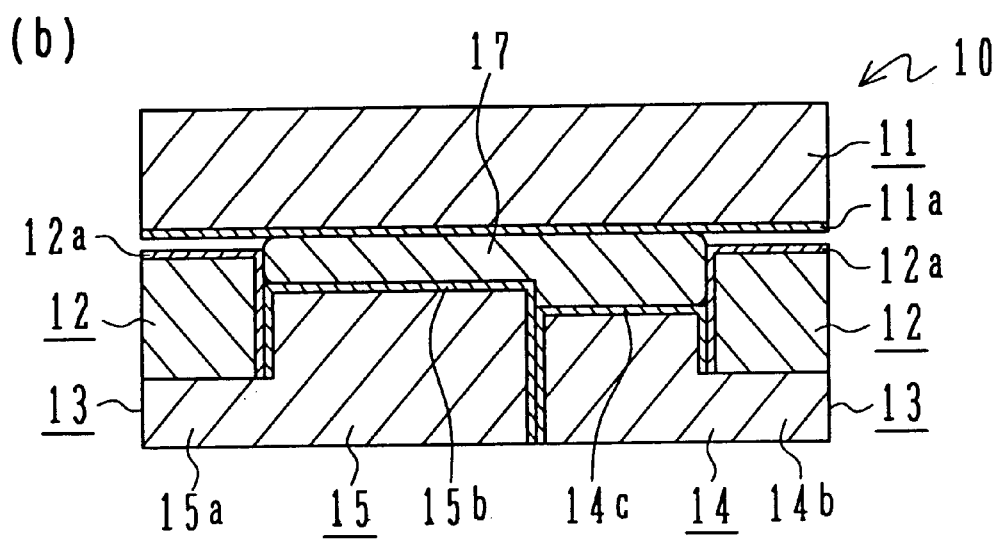
Figure 3:
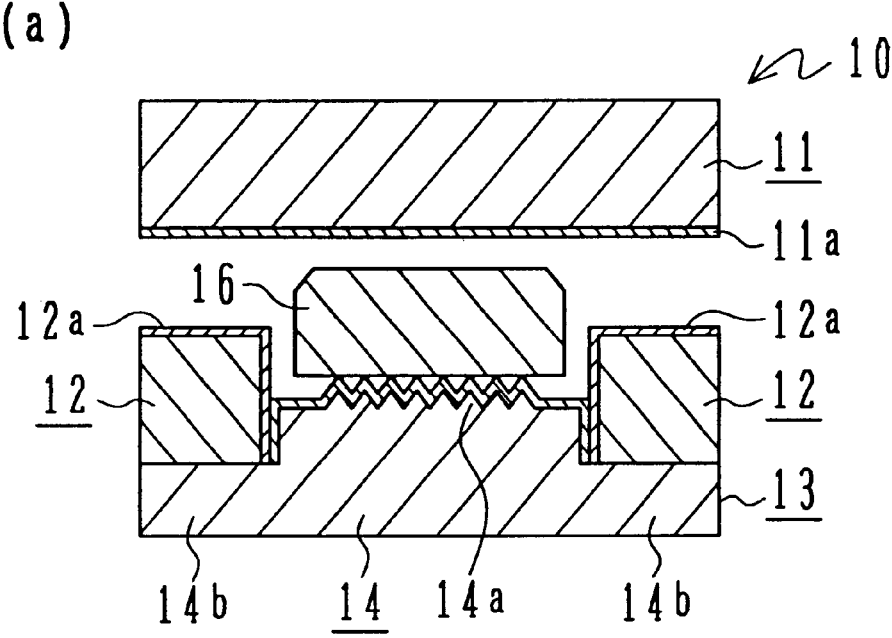
FIGS. 3(a) and 3(b) are schematic cross-sectional views, viewed from an end, of one example of the mold used in the method of the present invention.
Figure 3:
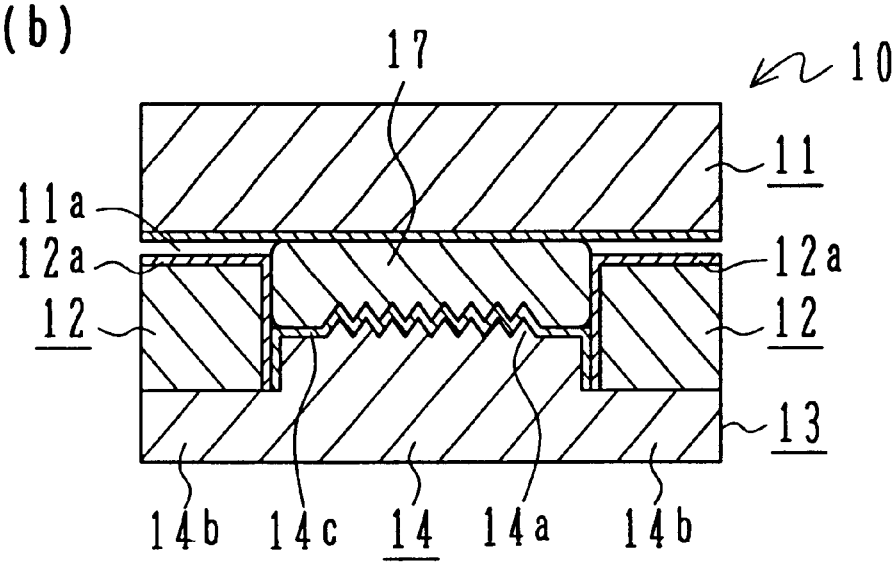

Specifically, when an optical fiber guide block shown in FIG. 1 is produced as a molded article, a mold shown in FIGS. 2 and 3 can be used. FIG. 1 shows a schematic perspective view of an optical fiber guide block as an example of the molded article produced according to the method of the present invention. FIGS. 2 and 3 show schematic cross-sectional views of the mold used in the method of the present invention, which is viewed from a side and an end of the mold. FIG. 2 and 3 show the mold used for producing the optical fiber guide block shown in FIG. 1. In each of FIGS. 2 and 3, (a) shows a mold in a state before press-molding, and (b) shows a mold in a state after the press-molding.

The optical fiber guide block 1 shown in FIG. 1 has an optical fiber fixing portion 3 having an upper surface 3a in which eight optical fiber fitting portions 2 made of V grooves are formed and a step portion 4 having an upper surface 4a formed at a level lower than the level of the above optical fiber fitting portion 2, and the step portion 4 is formed so as to be adjacent to the above optical fiber fixing portion 3. The step portion 4 is formed so as to sink perpendicularly from the optical fiber fixing portion 3.

A mold 10 shown in FIGS. 2 and 3 is constituted of three mold members such as an upper mold member 11, a sleeve 12 and a lower mold member 13. Generally, one surface of the upper mold member 11 which is the second old member is provided with a release film 11a. The sleeve 12 is a cylindrical mold member having a rectangular cross-sectional form when cut horizontally. The sleeve 12 is integrated into the lower mold member 13 to constitute the first mold member. Generally, the sleeve 12 during use has a release film 12a on its upper surface and internal side surface.

In FIGS. 2 and 3, the lower mold member 13 is provided with a first molding portion 14 having a transfer molding surface for forming the upper surface 3a of the optical fiber fixing portion 3 of the optical fiber guide block 1 (see FIG. 1) and a second molding portion 15 having a transfer molding surface for forming the upper surface 4a of the step portion 4 of the optical fiber guide block 1. The first molding portion 14 and the second molding portion 15 is mechanically integrated with a fixing frame (not shown).

The first molding portion 14 has the form of a quadrangular prism. The upper end portion (the term "upper" means a position during use) of the first molding portion 14 has a predetermined number of convex portions (pattern transfer portion) 14a having a form corresponding to the form of the optical fiber fitting portions to be formed. The lower end portion of the first molding portion 14, excluding the surface to be contact with the second molding portion 15, is provided with a flange portion 14b for being engaged with the lower surface of the sleeve 12 (the term "lower" means a position during use). The second molding portion 15 also has the form of a quadrangular prism. The upper surface of the second molding portion 15 is formed of a flat surface and is positioned above the upper surface (flat surface excluding the convex portions 14a) of the first molding portion 14 (the term "upper" means a position during use), and a height difference is produced in a boundary between the first molding portion 14 and the second molding portion 15. The lower end portion of the second molding portion 15, excluding the surface to be contact with the first molding portion 14, is also provided with a flange portion 15a for being engaged with the lower surface of the sleeve 12 (the term "lower" means a position during use).

The upper surface of the above first molding portion 14 and a side surface formed from said upper surface to the upper surface of the flange portion 14b are generally provided with a release film 14c. Further, the upper surface of the above second molding portion 15 and side surfaces formed from said upper surface to upper surfaces of the flange portion 15a and the first molding portion 14 are generally provided with a release film 15b.

In FIGS. 2 and 3, numeral 16 shows a preform, and numeral 17 shows a molded article.

The material for the above mold for use in the present invention is generally selected from a hard metal, steel or a ceramic such as silicon carbide, and the above release films are generally made from platinum, gold, carbon or diamond.

The preform for use in the present invention (1) has a polyhedral form that permits the fitting thereof into the concave portion of the above first mold member and (2) has opposed first and second surfaces having different sizes (provided that the second surface is positioned in a region of the first surface when viewed as a plan view), a side surface communicating with a circumferential edge portion of said first surface and a circumferential portion formed of an edge portion of the side surface and a circumferential edge portion of said second surface.

The form of the opposed first and second surfaces of the above preform is not critical and can be selected as required depending upon the form of a molded article as an end product. The above form may be rectangular, square, circular, oval, or the like.

In the present invention, the preform has the first surface and the second surface which are opposed to each other, as described above. When the preform comes in contact with the mold, these surfaces come into contact with the mold. Therefore, the mold and the release films formed on the mold are not much damaged, a molding pressure is steady, and a molding pressure can be uniformly exerted on the preform. As a result, for example, when a step (height difference) and a fine pattern of the optical fiber guide block are transferred, these can be transferred highly accurately.

Further, the preform has a polyhedral form which permits fitting thereof into the concave portion of the first mold member of the mold. The preform having such a form can be prepared by any one of methods in which edges surrounding one bottom surface of a columnar molding material are removed, for example, by cutting, edges surrounding one surface of a plate-shaped molding material are removed, for example, by cutting, or edges surrounding one surface of a rectangular-parallelepiped-shaped or cubic molding material are removed, for example, by cutting. The preform having the above form can be also prepared by a casting method to be described later.

The form (surface) of a circumferential portion formed by the edge portion of the above side surface and the circumferential edge portion of the second surface may be any form so long as the form (surface) can work as a surface formed by chamfering. For example, the above form includes a slanting flat surface, a slanting curved surface and a stepwise-formed surface.

Figure 4:
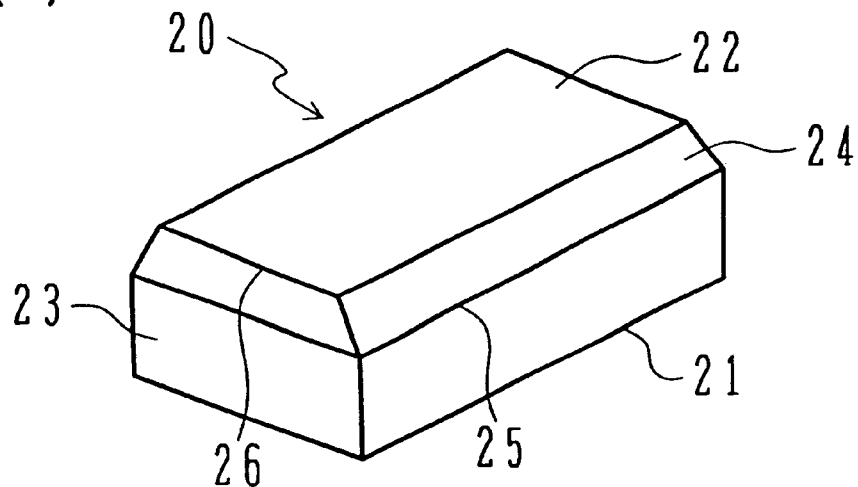
FIGS. 4(a) and 4(b) are perspective views of different preform examples used in the method of the present invention.
Figure 4:
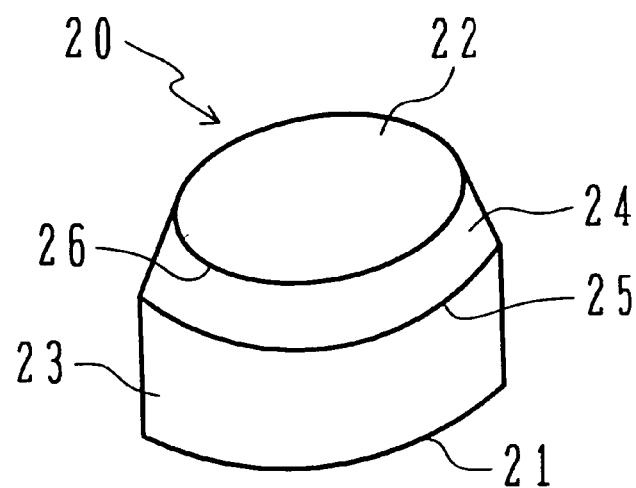

FIG. 4 shows perspective views of different examples of the preform used in the present invention.

In FIG. 4, (a) shows a preform having the opposed first surface and second surface which are rectangular, and (b) shows a preform having the opposed first surface and second surface which are circular. The preform shown in (a) can be used for producing the optical fiber guide block shown in FIG. 1 as a single molded article. The preform shown in (b) can be used for producing a multiple molded article of an optical fiber guide block shown in FIG. 5.

Figure 5:
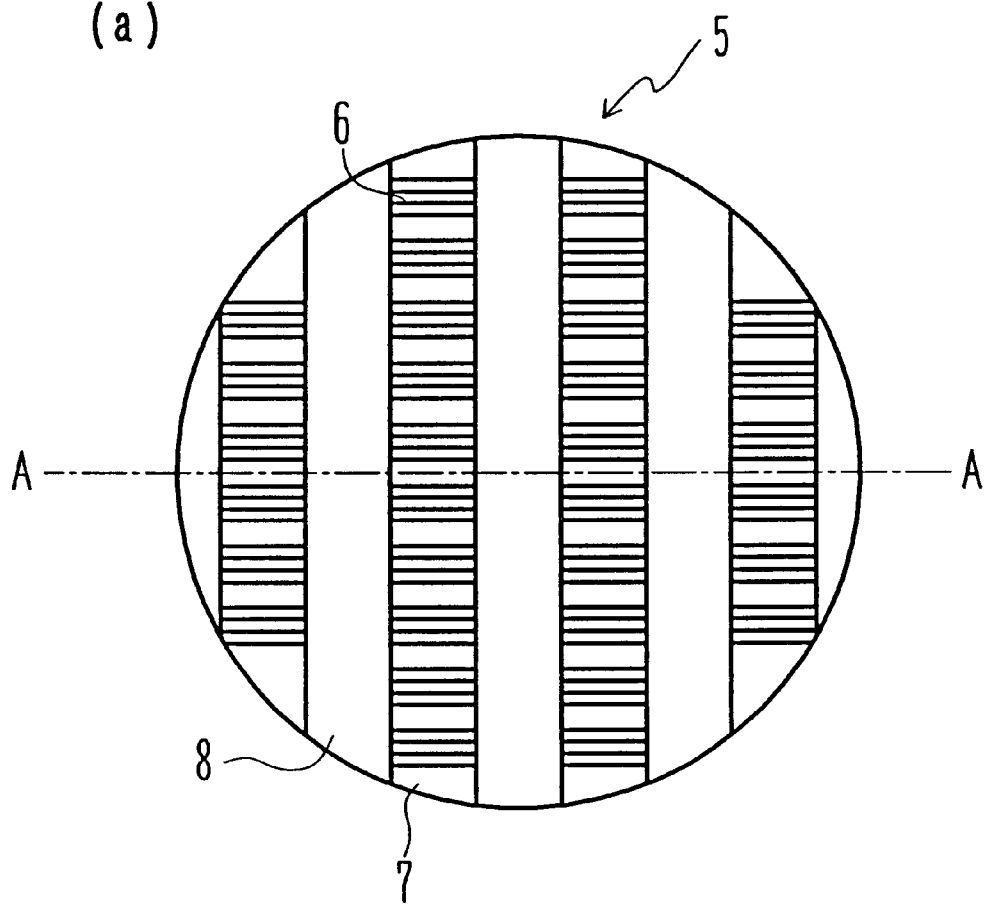
FIG. 5(a) is a plan view of a multi-product of optical fiber guide blocks.
FIG. 5(b) is a cross-sectional side view taken along line A—A in FIG. 5(a).
Figure 5:
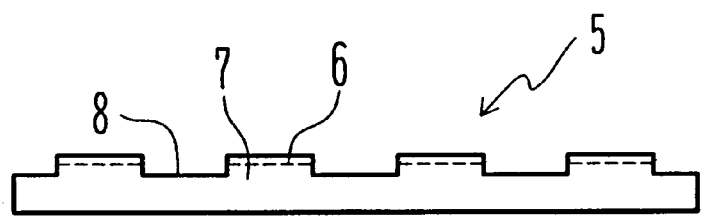

FIG. 5 shows a plan view (a) of one example of a multiple product of an optical fiber guide block and a side view (b) taken along a line A—A. An optical fiber guide block 5 has a plurality of optical fiber fixing portions 7 having an upper surface in which optical fiber fitting portions 6 are formed and a plurality of step portions 8 having an upper surface at a level lower than the level of the above optical fiber fitting portions 6. The step portions 8 are formed so as to be adjacent to the optical fiber fixing portions 7. The preform 20 shown in FIG. 4(b) has a first surface 21 and a second surface 22 which are opposed to each other (the second surface 22 is positioned in the region of the first surface 21 when viewed as a plan view), a side surface 23 communicating with the circumferential edge portion of the first surface 21 and a circumferential portion 24 made of a slanting surface surrounded by an edge portion 25 of the side surface 23 and a circumferential edge portion 26 of the second surface 22.

Such a preform can be obtained by chamfering and removing edge surrounding one bottom surface of a columnar molding material to form the circumferential portion 24.

The removal amount of edge from a columnar material for forming a chamfered portion which is a circumferential portion 24 of the above preform can be calculated on the basis of the following equation.

Removal amount=deformation amount−(clearance amount+amount of gap between the first mold member and the second mold member)

The above deformation amount refers to a glass flow amount necessary for deforming a preform so as to have dimensions of a molded article as an end product, and it can be shown as a volume or as a thickness for convenience (for simplification). The above clearance amount refers to a gap between a side surface of the preform and a side surface of the mold when the preform is arranged in the first mold member, and it can be shown as a volume or as a length for convenience (for simplification). The above amount of gap between the first mold member and the second mold member refers to an amount of glass of the molded article present in the gap between the first mold member and the second mold member or a distance of the gap between the first mold member and the second mold member (distance between 11a and 12a in FIG. 2(b) or 3(b)) when the mold is not completely closed, and it can be shown as a volume or a length. The above removal amount refers to an amount of removal of a circumferential portion of the first or second surface of the preform when the preform is viewed as a plan view (when the preform is chamfered, the removal amount refers to a chamfer amount), and it is defined by the right side of the above equation and can be shown as a volume or a length.

Figure 6:
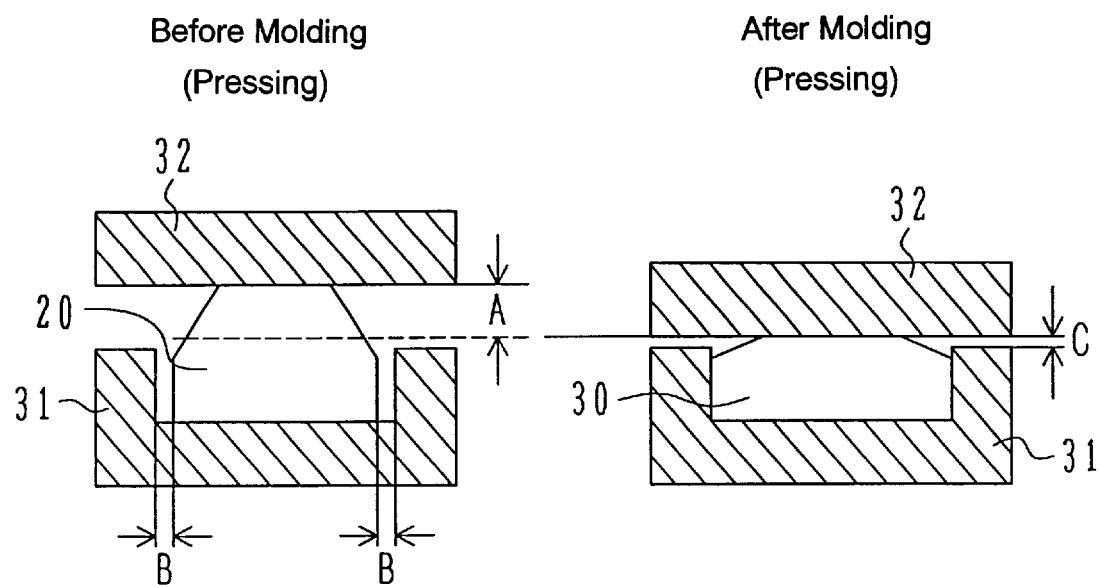
FIG. 6 shows schematic side views of a mold before and after molding, for explaining a deformation amount, a clearance amount and an amount of a gap between the first mold member and the second mold member.

FIG. 6 shows schematic side views showing states of a mold before and after molding for explaining the above deformation amount, the above clearance amount and the above amount of gap between the first mold member and the second mold member. Numeral 31 shows the first mold member, numeral 32 shows the second mold member, numeral 20 shows a preform and numeral 30 shows a molded article. In FIG. 6, A shows a deformation amount, B shows a clearance amount and C shows an amount of gap between the first mold member and the second mold member.

A chamfered portion can be formed according to the above equation such that the volume of a preform before molding equals the volume of a molded article after the molding. According to the above equation, further, a balance between vertical and horizontal gaps between the mold and the preform can be optimized, and under some molding conditions, the chamfering amount and form can be experimentally optimized. When the second mold member (upper mold member) is a mold member in which the molding surface thereof and a surface surrounding the molding surface constitute one flat surface, preferably, chamfering is carried out such that the height of side surface of a chamfered portion (height of a portion where the side surface communicating with the circumferential edge portion of the first surface and the circumferential portion formed by the chamfering come in contact) is equivalent to, or smaller than, the height of the upper surface of the first mold member (lower mold member).

In the preform of the present invention, since the only edge surrounding surface which face the second mold member is removed, the removing amount is larger than the removing amount of the preform which is chamfered in both surfaces which face the first mold member and the second mold member. According to the method of producing a molded article of the present invention, the processing or molding cost of the preform can be reduced. In these points, the preform of the present invention differs from the preform of the conventional preform which is made for the purpose of only preventing the occurrence of chipping or burrs in molding.

For obtaining a molded article free of an axial deviation and with high appearance accuracy, it is desirable to position the preform in the center of the mold as accurately as possible. On the other hand, for mass-producing products, a clearance is required for easily supplying performs automatically.

The present inventors have studied the axial deviation of products, and as a result, it has been found that a proper clearance exists and that the value thereof is in the range of 20 to 100 $\mu$m.

When the preform is placed in the concave portion (cavity) of the first mold member, the preform may be placed to shift its position in the cavity if the clearance between the cavity and the preform is large. When the shift is large, a molding material cannot be filled in a portion to be formed with high accuracy, or a molding material is filled in a portion not to be filled with such, and a burr may be formed. In the method of the present invention, however, the clearance between the cavity and the preform is small, which leads to a decrease in the shift of the position of the preform, so that stable molding can be carried out with high accuracy.

The outer dimensions of the preform can be calculated on the basis of the volume of cavity of the mold and the volume of a molded article under a condition that the optimum clearance is 20 to 100 $\mu$m, in view of the fact that the preform can be dropped in the cavity of the mold and that no axial deviation takes place since positioning can be made.

For example, when the optical fiber guide block shown in FIG. 1 [total length 10.30 mm, total width 3.70 mm, thickness of V groove portion (optical fiber fixing portion) 1.50 mm, length of V groove portion 5.00 mm, thickness of setting portion (step portion) 1.26 mm, length of the setting portion 5.30 mm, v groove pitch 0.25 mm, V groove depth 0.14 mm, V groove length 5.00 mm, number of V grooves 8] is produced as a molded article, a preform as shown in FIG. 4(*a*), which is a rectangular parallelepiped having one surface whose circumferential region is chamfered, can be used. The dimensions of such a preform can be calculated as follows.

(1) Standard dimensions of the optical fiber guide block are used as dimensions of the cavity of the mold.

(2) A standard volume of the optical fiber guide block is calculated on the basis of the above standard dimensions.

(3) The length and the width of the preform are determined on the basis of the outer dimensions of the molded article and the optimum clearance.

(4) Since the minimum chamfering amount necessary for preventing burrs is 0.3 to 0.6 mm, the chamfering amount is determined to be >0.6 mm.

(5) Since the optimum deformation amount is 0.10 to 0.25 mm, the preform has a thickness of approximately 1.65 mm.

The material for the preform in the present invention can be selected from various materials depending upon use of the molded article. When the molded article is an optical fiber guide block, glass is particularly preferred, since high accuracy in pattern transfer can be achieved and since there can be obtained a molded article whose internal strain is small. As a glass, it is advantageous to use a glass which has a flex temperature of approximately 850° C. or lower, preferably 750° C. or lower, and shows an average thermal expansion coefficient of $70 \times 10^7/°$ C. or less in a temperature range of from $-50°$ C. to $+100°$ C. More preferred is a glass which has a viscosity in the range of from $10^7$ to $10^{10}$ Pa·s at a temperature of from 500 to 750° C.

For obtaining an optical fiber guide block having optical fiber fitting portions transferred highly accurately, the preform preferably has an average roughness of 1 $\mu$m or less in a portion which comes in contact with the transfer molding surface of the mold for forming the optical fiber fitting portions.

The method for preparing the preform for use in the method of the present invention is not specially limited. For example, the preferably can be prepared by (1) a cutting method or (2) a casting method.

In the above cutting method, a polyhedral material which can be fitted into the concave portion of the first mold member of the mold is taken from a molding material block by slicing, etc., and the polyhedral material is polished on both the surfaces, to obtain a preform material. Then, the preform material is chamfered in part of a side surface which is to communicate with the second surface, with a grinder, or the like, whereby a preform having a desired form can be prepared.

Otherwise, that surface which is to constitute a molded surface is polished, and then the polyhedral material is cut from a molding material block and then chamfered.

In the above casting method, a molding material is cast into a die having a predetermined form in a state where the molding material has flowability, the molding material is solidified, and then a solid material is released from the above die, whereby a desired preform can be prepared.

When such a preform is used, molding can be carried out with high pattern transfer accuracy and high outer form accuracy while preventing the occurrence of burrs.

In the method of producing a molded article, provided by the present invention, the above preform is set in a mold comprising the first mold member having a concave portion whose internal surface constitutes a molding surface and the second mold member to be opposed to the first mold member, such that the second surface of the preform faces the above second mold member, the preform is heated to a temperature at which the preform is deformable, and while the preform is in a state where it has a temperature equivalent to, or higher than, a temperature at which the preform is deformable, the preform is press-molded such that the distance between the molding surface of the first mold member and the molding surface of the second mold member can decrease with following the deformation of the preform, whereby a molded article as an end product can be obtained.

In the above molding, it is preferred to set the molding temperature at a temperature which is as low as possible so long as the preform can be deformed at such a temperature, for preventing the outflow of a molding material through an open mold side. When the molding material is a glass, the molding temperature is set generally in the range of from 480 to 750° C., preferably from 500 to 650° C. The molding pressure is determined as required depending upon the material of the preform, the molding temperature, the molding time period and the deformation amount. When the molding material is a glass, the molding pressure is generally in the range of from 0.2 to 50 N/mm$^2$, preferably 2 to 30 N/mm$^2$. The pressing time period is generally in the range of from 5 to 250 seconds.

The above molding is preferably carried out in an atmosphere of an inert gas such as nitrogen gas. Further, after the molding, a molded article in the mold is cooled to a temperature around the glass transition temperature of the molding material at a rate of approximately 20 to 70° C./minute, the pressure is removed, then, the molded article is cooled to a proper temperature and taken out of the mold, and the molded article is cooled to room temperature.

In the above molding, advantageously, the first mold member having the concave portion having an inner surface formed of the molding surface is used as a movable mold member, the opposed second mold member is used as a fixed upper mold member, and the lower mold member is upwardly moved for the press-molding.

Further, when the molded article is an optical fiber guide block, it is required to transfer a fine pattern with high accuracy, for forming the fine pattern in the surface thereof. When the molding material is a glass, the glass may separate from the mold before the temperature set for taking the molded article from the mold is reached, due to difference between the thermal expansion coefficient of the mold material and the counterpart of the glass. It is therefore essential to prevent the above separation. In the molding process before the molded article is taken out, it is preferred to carry out the press-molding such that a pressure is constantly exerted on the glass without completely clamping the first mold member and the second mold member, whereby highly accurate transfer can be attained. In such a molding method, it is preferred to use a preform having a volume larger than the volume of the cavity formed by the mold members, and desirably, the viscous resistance of the glass is higher than the molding pressure. Therefore, the press-molding is preferably carried out in a state where the glass as a molding material has a viscosity of approximately $10^{7.6}$ Pa·s or higher.

According to the present invention, various optical products such as an optical fiber fixing member, a waveguide, a lens, a microlens array, a prism, a disk substrate, etc., can be produced as products having excellent outer form accuracy and having a fine pattern transferred highly accurately by molding without causing burrs using a preform having a simple form.

EXAMPLES

The present invention will be explained with reference to Examples hereinafter, while the present invention shall not be limited by these Examples.

EXAMPLE 1

In Example 1, an optical fiber guide block having the form shown in FIG. 1 is produced. The optical fiber guide block has a total length L of 10.30 mm, a total width B of 3.70 mm, a V groove portion thickness T of 1.50 mm, a V groove portion length L1 of 5.00 mm, a setting portion thickness T2 of 1.26 mm and a setting portion length L2 of 5.30 mm. The V groove pattern has a V groove pitch p of 0.25 mm, a V groove depth t of 0.14 mm and a V groove length L1 of 5.00 mm, and the number of the V grooves is eight. This optical fiber guide block will be referred to as "V-grooved 8FGB" hereinafter.

The V-grooved 8FGB is calculated for a volume and a weight, to obtain the following values.

Volume of V groove portion
=(L1×B×T)−(p×t×L1×8/2)
=27.75−0.70=27.05 (mm$^3$)
Volume of setting portion
=L2×B×T2
=5.3×3.7×1.26=24.71 (mm$^3$)
Total volume of V-grooved 8FGB
=Volume of V groove portion+volume of setting portion
=27.05+24.71=51.76 (mm$^3$)
Total weight of V-grooved 8FGB
=51.76×3.18=164.6 (mg)
(Calculated as specific gravity of glass is 3.18)
(1) Preparation of Preform Dimensions of portions of the preform to be produced are determined to be 51.76 mm$^3$ which is the total volume of the above V-grooved 8FGB. When the clearance is determined to be 0.05 mm and when the optimum thickness is determined to be 1.65 mm, therefore, the preform comes to have a length of 10.20 mm and a width of 3.60 mm, and the chamfering amount comes to be approximately 0.9 mm according to the following calculation.

The chamfering amount is determined by calculating the volume of glass removed from the circumferential portion of the non-chamfered preform by the chamfering. That is, when the chamfering amount is C, and when volumes of portions to be chamfered are Va, Vb and Vc, Volume V0 of the preform before the chamfering
=10.20×3.60×1.65=60.588 (mm$^3$)
Standard volume V of the preform
=V0−(Va+Vb+Vc)51.76=60.588−[(10.2−2C)C$^2$+(3.60−2C)C$^2$+C$^3$]3C$^3$−13.8C$^2$+8.828=0C≈0.9 (mm)

Figure 7:
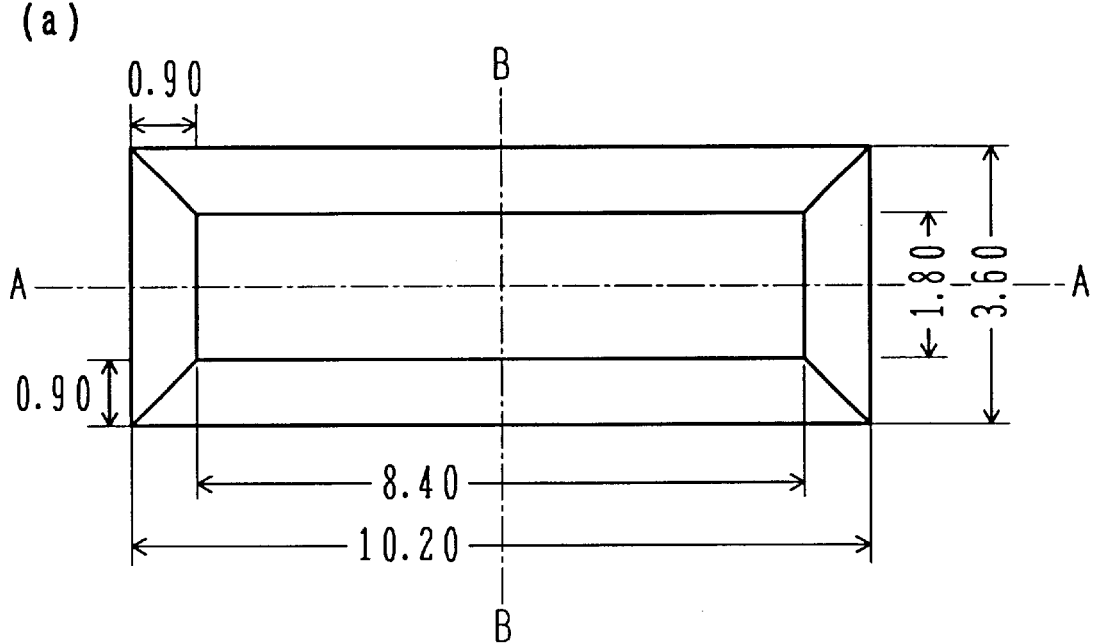
FIG. 7(a) is a plan view of a preform used in Example 1.
FIG. 7(b) is a cross-sectional view taken along line A—A in FIG. 7(a) (viewed from a side)
FIG. 7(c) is a cross-sectional view taken along line B—B in FIG. 7A (viewed from a front).
Figure 7:
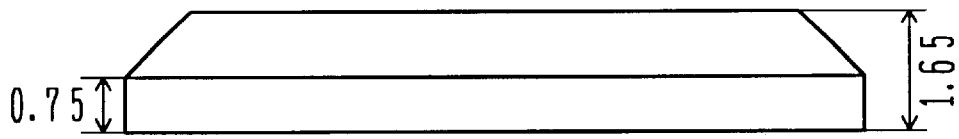
Figure 7:

FIG. 7 shows a form and dimensions of the above preform.

In FIG. 7, (a) shows a plan view of the preform used in Example 1, (b) shows a side view (cross-sectional view taken along a line A—A), and (c) shows a front view (cross-sectional view taken along a line B—B).

The above preform was prepared as follows.

Figure 8:
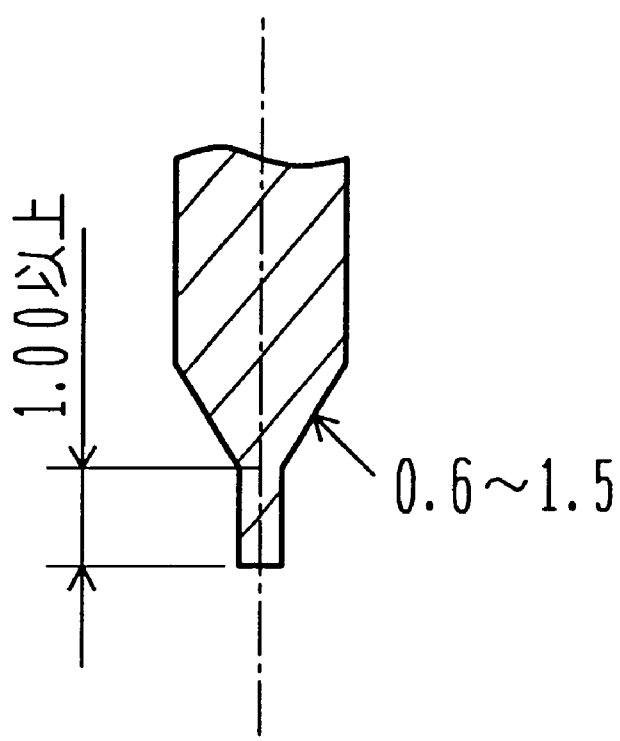
FIG. 8 is a schematic partial cross-sectional view of one example of top form of a grinder used for chamfering in the production of a single preform having a square form.

A glass block having a square size of 200 mm×200 mm was sliced to obtain a glass plate having a thickness of 2.00 mm and a square size of 50 mm×50 mm. The glass plate was polished on both the surfaces to obtain a glass substrate having a thickness of 1.65 mm and a surface average roughness of 0.5 μm. The glass substrate was used as a material for the preform. The glass substrate was cut with a grinder having a top end form shown in FIG. 8 so as to form a surface having a chamfered circumference, whereby 100 preforms having the form shown in FIG. 7 were prepared.

(2) Production of Optical Fiber Guide Block

The preform prepared in the above (1) was molded in a mold comprising the upper mold member, the sleeve and the lower mold member shown in FIG. 2 as follows, to obtain a V-grooved 8FGB.

The above mold 10 was made of hard metal, and at least its surface which was to come in contact with the preform was provided with a carbon containing release film.

First, the preform 16 obtained in the above (1) was mechanically aligned and dropped in the cavity of the lower mold member 13 integrated into the sleeve 12, and the lower mold member 13 with the preform in it was placed in the center of a heater. The preform was heated to 550° C. [the glass had a viscosity of $10^8$ Pa·s (pascal-second) in this case] in a nitrogen atmosphere, and then the lower mold member 13 was elevated at a molding pressure of 18 N/mm². The preform was press-molded for 30 seconds without completely closing the mold. Then, the press-molded product was cooled to approximately a Tg of glass (glass transition point) at a rate of 30° C./minute, and the pressure was released so as to separate the upper mold member and the lower mold member at the Tg temperature. After the Tg temperature, the press-molded product was rapidly cooled to 350° C. at a rate of 50°C./minute, and the molded product was taken out from the mold and cooled to room temperature, to give an optical fiber guide block (V-grooved 8FGB) having the form shown in FIG. 1.

V-grooved 8FGBs in the total quantity of 100 were obtained in the same manner, and each of them was measured for a V groove portion accumulated pitch accuracy and a V groove depth accuracy with a tracer-method configuration measuring apparatus. Further, each was measured for a width and a thickness (maximum thickness) with a digital magic indicator, and variability widths thereof were determined. Table 2 shows the results.

Table 1 shows the method of preparing the preforms, outer dimensions thereof and a clearance between the preform and the cavity.

Further, the above-obtained optical fiber guide blocks were evaluated for surfaces and appearances with a CCD camera and an optical microscope. As a result, burrs, cracking, chipping and surface defects were not observed.

EXAMPLE 2

Optical fiber guide blocks (V-grooved 8FGB) were produced in the same manner as in Example 1 except that the preforms were replaced with preforms which had a form and a clearance from the cavity shown in Table 1 and which were prepared by a cutting method.

Table 2 shows a V groove accumulated pitch accuracy of the above optical fiber guide blocks, a V groove depth accuracy thereof and variability widths of the width and thickness values thereof.

Further, the above-obtained optical fiber guide blocks were evaluated for surfaces and appearances with a CCD camera and an optical microscope. As a result, burrs, cracking, chipping and surface defects were not observed.

EXAMPLE 3

Optical fiber guide blocks (V-grooved 8FGB) were produced in the same manner as in Example 1 except that the preforms were replaced with preforms which had a form and a clearance from the cavity shown in Table 1 and which were prepared by a casting method using a die having a predetermined cavity.

Table 2 shows a V groove accumulated pitch accuracy of the above optical fiber guide blocks, a V groove depth accuracy thereof and variability widths of the width and thickness values thereof.

Further, the above-obtained optical fiber guide blocks were evaluated for surfaces and appearances with a CCD camera and an optical microscope. As a result, burrs, cracking, chipping and surface defects were not observed.

EXAMPLES 4 AND 5

In these Examples, a disk-shaped multi-product of optical fiber guide blocks having the form shown in FIG. 5 were produced. In Examples 4 and 5, the disk-shaped multi-products had a diameter of 80.00 mm or 100.00 mm, the optical fiber fixing portion of each had a thickness of 1.50 mm and a width of 3.80 mm, and the step portion of each had a thickness of 1.26 mm and a width of 3.80 mm. The optical fiber fixing portion of each was provided with a plurality of sets of V-groove patterns, and in dimensions of the V-groove pattern of each set, the V groove pattern had a V groove pitch of 0.25 mm and a V groove depth of 0.14 mm, the number of the V grooves was eight. Further, the numbers of the optical fiber fixing portions and the step portions were 4 lines and 5 lines, so that 100 V-grooved 8FGBs were obtained by cutting in Example 4 and that 164 V-grooved 8FGBs were obtained by cutting in Example 5. The cutting allowance was 0.4 mm width.

(1) Preparation of Preform

Dimensions and thickness of preforms to be prepared, clearances between the preform and the cavity of a mold and chamfering amounts were determined in the same manner as in Example 1, and obtained data was finely controlled on the basis of experimental data.

Ten multi-product preforms having dimensions and clearances from the cavity of the mold and having the form shown in FIG. 4(*b*) were prepared in the same manner as in Example 1.

(2) Production of Optical Fiber Guide Block

The multi-product preforms prepared in the above (1) were molded according to a method similar to the method in Example 1, to produce multi-products of optical fiber guide blocks shown in FIG. 5. Then, single V-grooved 8FGBs were taken by cutting with a dicing saw. In Example 4, 100 FGBs were obtained, and in Example 5, 164 FGBs were obtained.

Table 2 shows a V groove accumulated pitch accuracy of the above optical fiber guide blocks, a V groove depth accuracy thereof and variability widths of the width and thickness values thereof.

Further, the above-obtained optical fiber guide blocks were evaluated for surfaces and appearances with a CCD camera and an optical microscope. As a result, burrs, cracking, chipping and surface defects were not observed.

TABLE 1

| | Preparation method | Outer dimensions of preform | | Chamfering amount | Clearance between preform and cavity of mold |
|---|---|---|---|---|---|
| | | Surface dimensions | Thickness | | |
| Ex.1 | Cutting | 10.2 × 3.6 mm | 1.65 mm | 0.9 mm | 50 μm |
| Ex.2 | Cutting | 10.0 × 3.4 mm | 1.60 mm | 0.6 mm | 150 μm |
| Ex.3 | Casting | 10.28 × 3.68 mm | 1.65 mm | 1.2 mm | 100 μm |
| Ex.4 | Cutting | φ79.9 mm | 1.70 mm | 1.0 mm | 50 μm |
| Ex.5 | Cutting | φ99.8 mm | 1.80 mm | 1.5 mm | 100 μm |

Ex. = Example

TABLE 2

| | Optical fiber fitting portion | | Optical fiber guide block | |
|---|---|---|---|---|
| | Accumulated pitch accuracy | Depth accuracy | Variability width of width values | Variability width of thickness values |
| Ex.1 | within ± 0.5 μm | within ± 0.5 μm | within ± 1 μm | within ± 5 μm |
| Ex.2 | within ± 0.5 μm | within ± 0.5 μm | within ± 1 μm | within ± 8 μm |
| Ex.3 | within ± 0.5 μm | within ± 0.5 μm | within ± 1 μm | within ± 5 μm |
| Ex.4 | within ± 0.5 μm | within ± 0.5 μm | within ± 1 μm | within ± 5 μm |
| Ex.5 | within ± 0.5 μm | within ± 0.5 μm | within ± 1 μm | within ± 8 μm |

Ex. = Example

EXAMPLE 6

Figure 9:
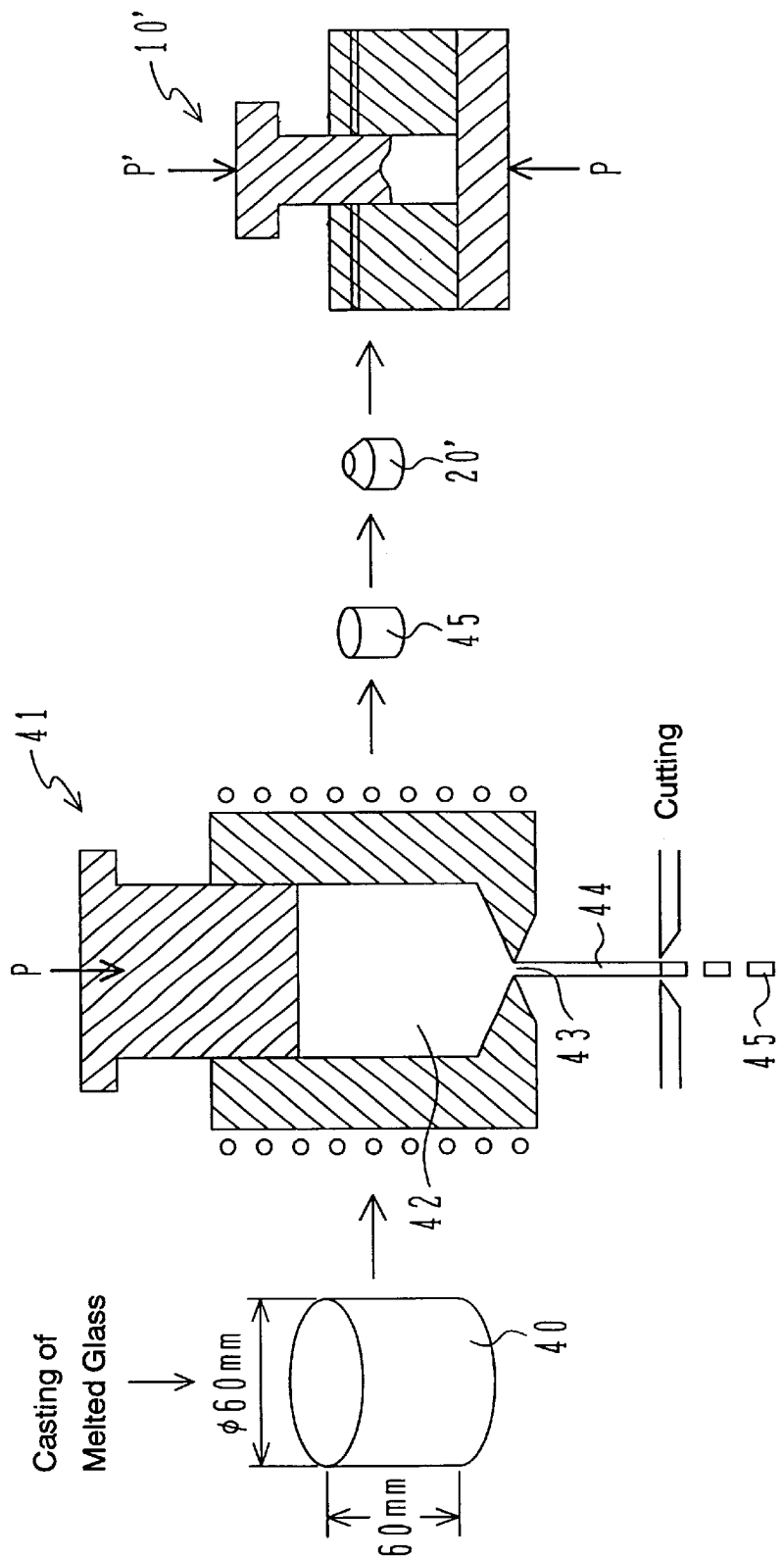
FIG. 9 shows steps of producing an optical microlens in Example 6.

In Example 6, a columnar preform shown in FIG. 4(b) was obtained, and an optical microlens was produced from the preform. FIG. 9 shows the steps of producing the optical microlens.

(1) Preparation of Preform

A preform 20' for an optical microlens was prepared by an extrusion molding method. As an optical glass material, a BaCD5 glass for glass molding, supplied by HOYA CORPORATION, was used.

First, the above glass was melted, and a columnar material 40 having a diameter of 60 mm and a height of 60 mm was prepared therefrom by a casting method. The columnar material was placed in a mold cavity 42 of an extruder 41 and heated up to 610° C., and a rod material 44 having a diameter of 1.95 mm was extruded through a nozzle 43. Immediately after the extrusion, the rod material was cut with a cutter into columnar pellets 45 having a length of 2 mm each. Then, the upper surface of one pellet 45 having a diameter of 1.95 mm and a height of 2 mm was chamfered by 0.8 mm with a cup grinder, to obtain a chamfered columnar preform 20'.

(2) Production of Optical Microlens

The chamfered columnar preform 20' obtained in the above (1) was inserted into a glass molding machine 10' and heated until the glass had a viscosity of $10^{7.6}$ Pa·s, and then the preform 20' was press-molded at a pressure of approximately 50 kg. After the molding, the molded product was gradually cooled to its Tg temperature, and then the pressure was released. The molded product was rapidly cooled to approximately 100° C., and a lens was taken out of a mold with a suction pad. The mold used in the above molding was made of a hard metal material and had a DLC (Diamond like Carbon) film attached thereto.

In the above manner, an aspherical lens having a diameter of 2 mm and a height of 1.5 mm was obtained. The lens was evaluated for an appearance, a surface roughness and an aspherical form, to show that the lens had excellent form accuracy and excellent optical properties.

What is claimed is:

1. A method of producing a molded article by providing a mold comprising a combination of a first mold member having a concave portion having an inner surface made of a molding surface and a second mold member which is to be opposed to the first mold member and has a molding surface and press-molding a preform under heat in the mold, the method comprising:

providing, as said preform, a preform which has (1) a polyhedral form that permits fitting thereof into the concave portion of the first mold member, (2) opposed first and second surfaces having different sizes provided that the second surface is positioned in a region of the first surface when viewed as a plan view, and (3) a side surface communicating with a circumferential edge portion of said first surface and a circumferential portion surrounded by an edge portion of the side surface and a circumferential edge portion of said second surface;

setting the preform in the mold such that the second surface faces said second mold member; and press-molding the preform such that the distance between the molding surface of the first mold member and the molding surface of the second mold member is decreased while the preform temperature is equivalent to, or higher than, a temperature at which the preform is deformable, wherein the press-molding is carried out without completely closing the mold.

2. The method of claim 1, wherein the preform has a volume larger than a volume of a cavity formed by a pair of molds and is press-molded.

3. A method of producing a molded article by providing a mold comprising a combination of a first mold member having a concave portion having an inner surface made of a molding surface and a second mold member which is to be opposed to the first mold member and has a molding surface and press-molding a preform under heat in the mold, the method comprising:

providing, as said preform, a preform which has (1) a polyhedral form that permits fitting thereof into the concave portion of the first mold member, (2) opposed first and second surfaces having different sizes provided that the second surface is positioned in a region of the first surface when viewed as a plan view, and (3) a side surface communicating with a circumferential edge portion of said first surface and a circumferential portion surrounded by an edge portion of the side surface and a circumferential edge portion of said second surface;

setting the preform in the mold such that the second surface faces said second mold member; and press-molding the preform such that the distance between the molding surface of the first mold member and the molding surface of the second mold member is decreased while the preform temperature is equivalent to, or higher than, a temperature at which the preform is deformable, wherein the preform is selected from a preform prepared by removing an edge surrounding one bottom surface of a columnar molding material, a preform prepared by removing an edge surrounding one surface of a disk-shaped molding material or a preform prepared by removing an edge surrounding one surface of a rectangular-parallelepiped-shaped or cubic molding material.

4. The method of claim 3, wherein a removal amount for removing above edge of the preform is calculated on the basis of an equation, Removal amount=deformation amount−(clearance amount+amount of gap between the first mold member and the second mold member)

wherein the deformation amount refers to a flow amount necessary for deforming the preform so as to have dimensions of the molded article as an end product, the clearance amount refers to a gap between a side surface of the preform and a side surface of the mold when the preform is arranged in the first mold member, and the amount of gap between the first mold member and the second mold member refers to a gap between the first mold member and the second mold member when the mold is not completely closed.

5. The method of claim 3, wherein the molding surface of the first mold member or the molding surface of the second mold member has a portion for transferring a pattern, and the pattern is transferred to the preform to obtain the molded article having a pattern, or each of the molding surface of the first mold member and the molding surface of the second mold member has a portion for transferring a pattern, and the patterns are transferred to the preform to obtain the molded article having patterns.

6. The method of claim 5, wherein the molding surface of the first mold member or the molding surface of the second mold member has the step, and the molding surface having the step further has the portion for transferring a pattern in a surface portion at a lower level, or each of the molding surface of the first mold member and the molding surface of the second mold member has the step and each of the molding surfaces having the step further has the pattern in a surface portion at a lower level.

7. The method of claim 3, wherein the molding surface of the first mold member or the molding surface of the second mold member has a step, and the step is transferred to the preform to obtain the molded article having a step, or each of the molding surface of the first mold member and the molding surface of the second mold member has a step, and the steps are transferred to the preform to obtain the molded article having steps.

8. The method of claim 7, wherein the molding surface of the first mold member or the molding surface of the second mold member has the step, and the molding surface having the step further has the portion for transferring a pattern in a surface portion at a lower level, or each of the molding surface of the first mold member and the molding surface of the second mold member has the step and each of the molding surfaces having the step further has the pattern in a surface portion at a lower level.

9. A method of producing a molded article by providing a mold comprising a combination of a first mold member having a concave portion having an inner surface made of a molding surface and a second mold member which is to be opposed to the first mold member and has a molding surface and press-molding a preform under heat in the mold, the method comprising:

providing, as said preform, a preform which has (1) a polyhedral form that permits fitting thereof into the concave portion of the first mold member, (2) opposed first and second surfaces having different sizes provided that the second surface is positioned in a region of the first surface when viewed as a plan view, and (3) a side surface communicating with a circumferential edge portion of said first surface and a circumferential portion surrounded by an edge portion of the side surface and a circumferential edge portion of said second surface;

setting the preform in the mold such that the second surface faces said second mold member; and press-molding the preform such that the distance between the molding surface of the first mold member and the molding surface of the second mold member is decreased while the preform temperature is equivalent to, or higher than, a temperature at which the preform is deformable, wherein the length of the gap between a side surface of the preform and an inner surface of the first mold member when the preform is arranged in the first mold member is 20 to 100 $\mu$m.

10. A method of producing a molded article by providing a mold comprising a combination of a first mold member having a concave portion having an inner surface made of a molding surface and a second mold member which is to be opposed to the first mold member and has a molding surface and press-molding a preform under heat in the mold, the method comprising:

providing, as said preform, a preform which has (1) a polyhedral form that permits fitting thereof into the concave portion of the first mold member, (2) opposed first and second surfaces having different sizes provided that the second surface is positioned in a region of the first surface when viewed as a plan view, and (3) a side surface communicating with a circumferential edge portion of said first surface and a circumferential portion surrounded by an edge portion of the side surface and a circumferential edge portion of said second surface;

setting the preform in the mold such that the second surface faces said second mold member; and press-molding the preform such that the distance between the molding surface of the first mold member and the molding surface of the second mold member is decreased while the preform temperature is equivalent to, or higher than, a temperature at which the preform is deformable, wherein the second mold member has the molding surface and a surface surrounding the molding surface, and the molding surface and the surface surrounding the molding surface constitute a flat single surface.

* * * * *